(12) United States Patent
Shanmugam

(10) Patent No.: US 10,599,728 B1
(45) Date of Patent: Mar. 24, 2020

(54) METADATA AGENT FOR QUERY MANAGEMENT

(71) Applicant: EMC Corporation, Hopkinton, MA (US)

(72) Inventor: Karunanithi Shanmugam, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 875 days.

(21) Appl. No.: 14/973,258

(22) Filed: Dec. 17, 2015

(51) Int. Cl.
G06F 16/9535 (2019.01)
H04L 29/06 (2006.01)
G06F 16/245 (2019.01)
G06F 16/22 (2019.01)

(52) U.S. Cl.
CPC ...... *G06F 16/9535* (2019.01); *G06F 16/2282* (2019.01); *G06F 16/245* (2019.01); *H04L 67/42* (2013.01)

(58) Field of Classification Search
CPC combination set(s) only.
See application file for complete search history.

(56) References Cited

U.S. PATENT DOCUMENTS

| | | | |
|---|---|---|---|
| 6,769,124 B1* | 7/2004 | Schoening | G06F 9/4493 719/316 |
| 6,970,882 B2* | 11/2005 | Yao | G06F 17/30539 |
| 9,165,036 B2* | 10/2015 | Mehra | G06F 16/24568 |
| 9,311,651 B2* | 4/2016 | Kirby | G06Q 30/0207 |
| 9,519,676 B1* | 12/2016 | Finnie | G06F 17/30377 |
| 10,255,302 B1* | 4/2019 | Cosic | G06F 3/011 |
| 2014/0095471 A1* | 4/2014 | Deshmukh | G06F 16/24568 707/714 |

\* cited by examiner

*Primary Examiner* — Shyue Jiunn Hwa
(74) *Attorney, Agent, or Firm* — Chamberlain, Hrdlicka, White, Williams & Aughtry

(57) ABSTRACT

A method for processing queries includes a master device receiving a query from a client device, and interpreting the query to identify a data record identifier matching the query. The method further includes obtaining, using a metadata table on the master device, a segment device identifier storing a data record identified by the data record identifier for the query, sending the query to a segment device, the segment device being identified by the segment device identifier, and receiving a result of the query from the segment device. The method further includes transmitting the result to the client device.

20 Claims, 6 Drawing Sheets

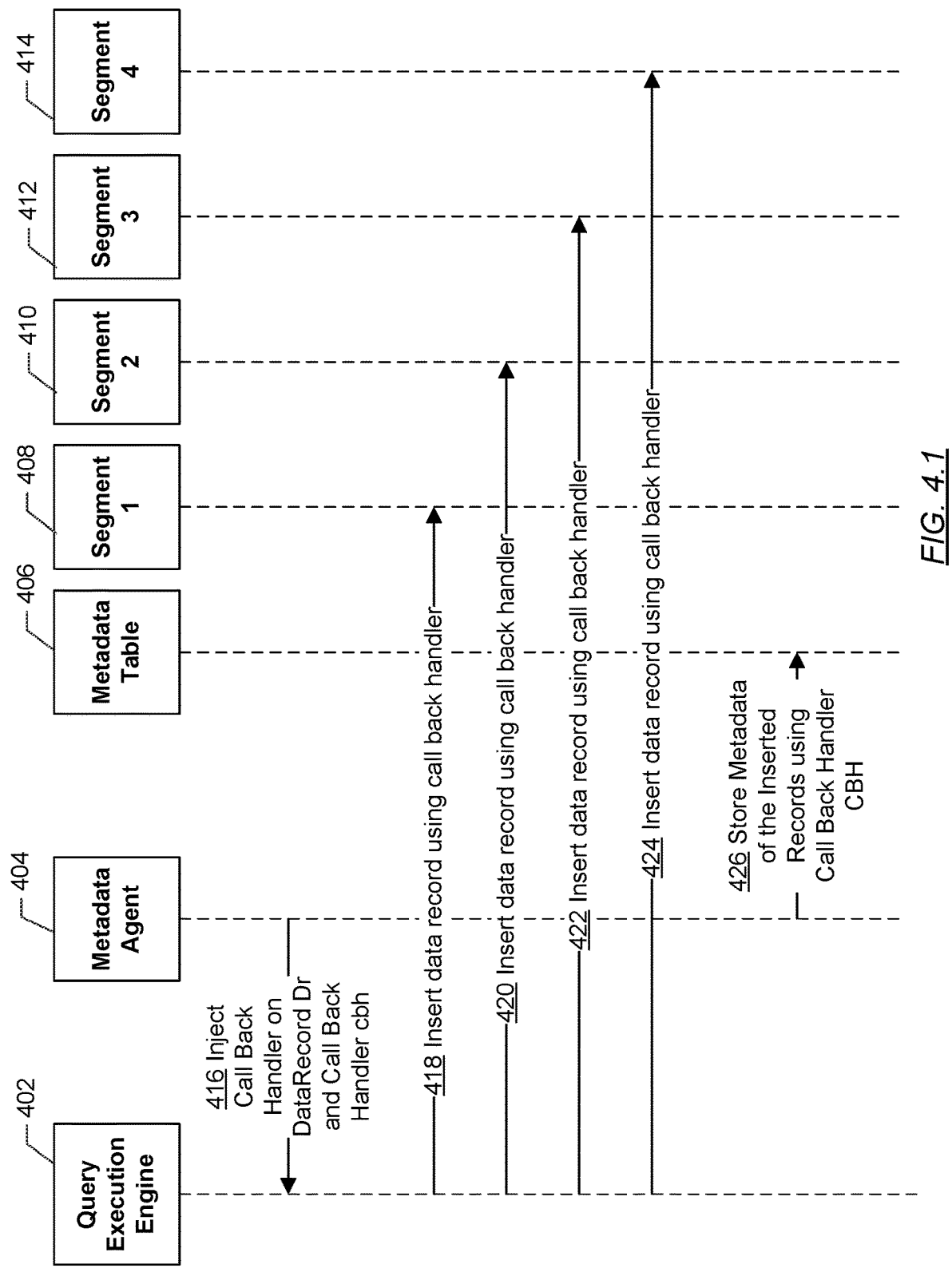
FIG. 4.1

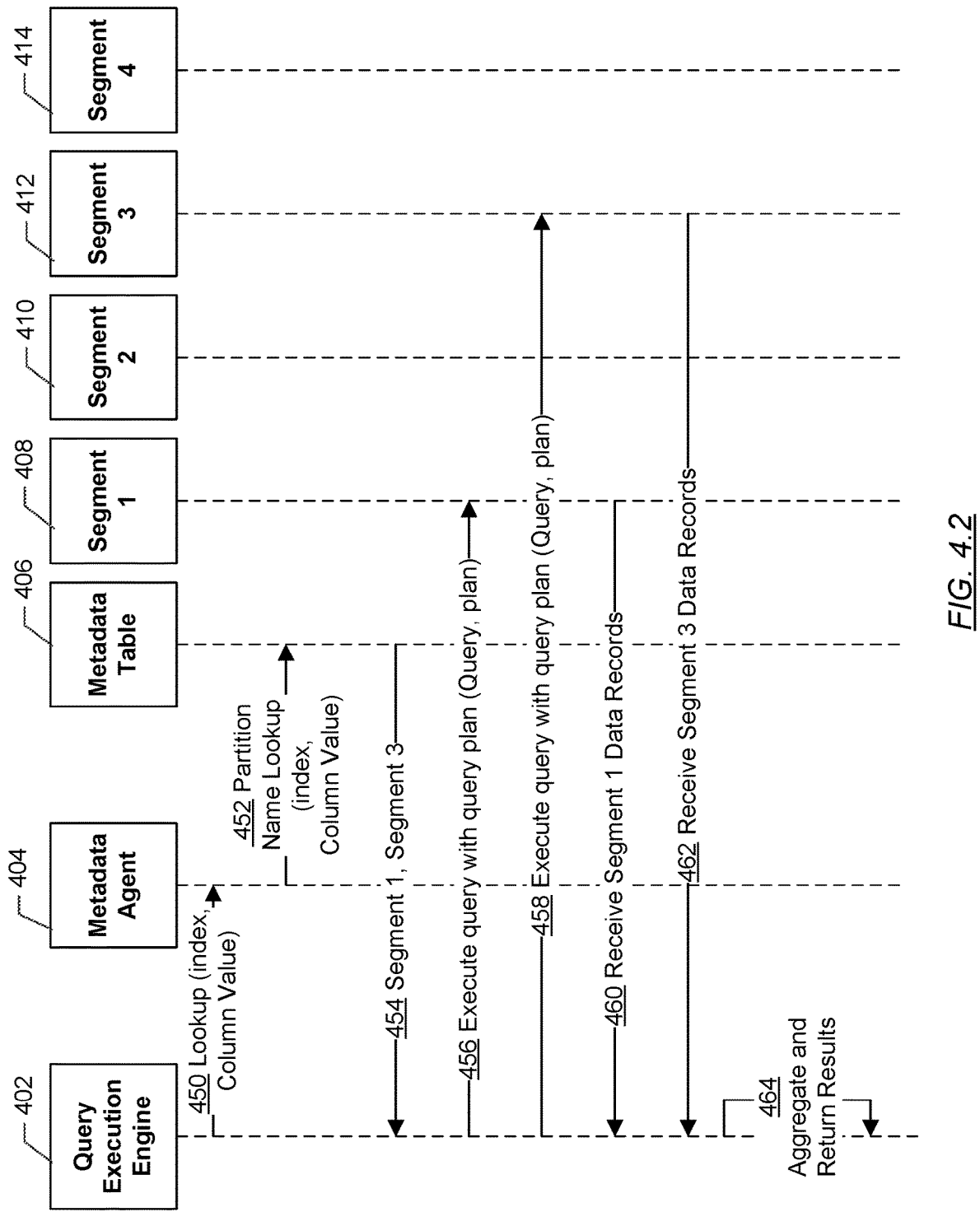
FIG. 4.2

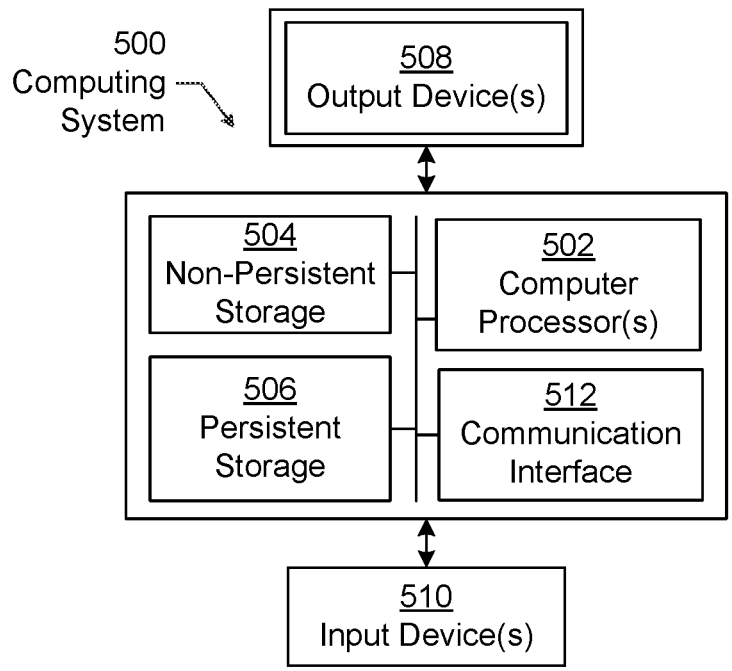
FIG. 5.1
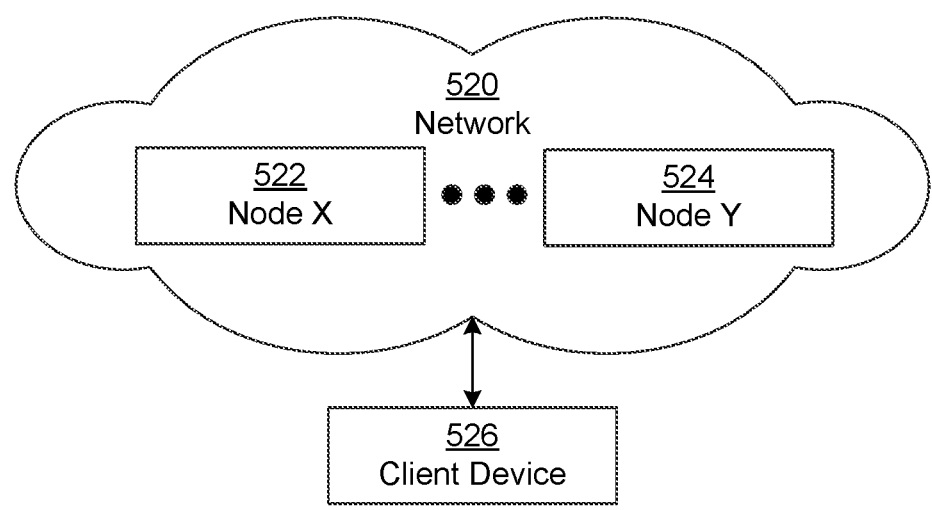
FIG. 5.2

METADATA AGENT FOR QUERY MANAGEMENT

BACKGROUND

Databases are pervasive in computing systems to manage large volumes of data. A database is a collection of tables that organize stored data. Queries, in the form of search requests, are transmitted to the server executing the database that processes the data. For large volumes of data, the database may span multiple servers. In such a scenario, the queries are sent to each server of the database to process the data and return the result.

BRIEF DESCRIPTION OF DRAWINGS

FIGS. 4.1 and 4.2 show examples in accordance with one or more embodiments of the technology.

FIGS. 5.1 and 5.2 shows computing systems in accordance with one or more embodiments of the technology.

DETAILED DESCRIPTION

Figure 1:
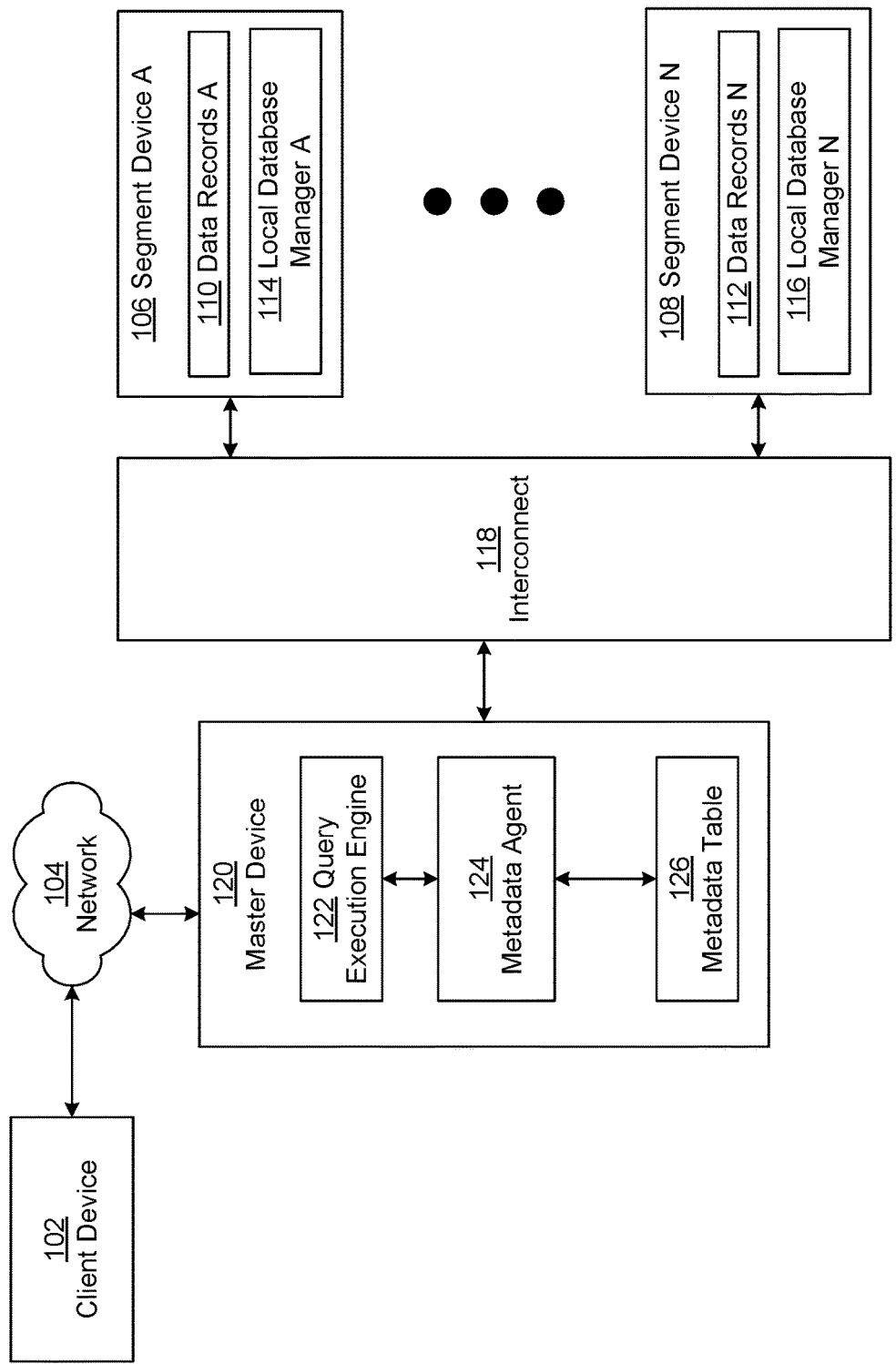
FIGS. 1 and 2 show schematic diagrams in accordance with one or more embodiments of the technology.

Specific embodiments of the technology will now be described in detail with reference to the accompanying figures. Like elements in the various figures are denoted by like reference numerals for consistency.

In the following detailed description of embodiments of the technology, numerous specific details are set forth in order to provide a more thorough understanding of the technology. However, it will be apparent to one of ordinary skill in the art that the technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the technology are directed to a centralized database management, whereby a master device receives a query and identifies the particular segment devices that stores the data records satisfying the query. The master device sends the query only to the segment devices having the particular data records.

As used herein, a database is an organized collection of tables. In particular, the database may include a collection of schemes, tables, views, reports, and other objects. Tables in the database are virtual data structures that maintain data records. In other words, the use of the term table may not represent the physical layout of the data in storage. Each table may have a defined set of attributes. A data record is a row in a table, and includes a related set of attribute values for the set of attributes. More particularly, each attribute value in the data record is related to each other attribute value by being in the same row in the table. One of the attributes of a table may correspond to the primary key attribute for the table. The primary key is a unique identifier of the data record amongst the data records in the table. For example, if the table is for people, the attributes may be name, address, phone number, social security number, etc. The primary key may be social security number or other unique identifier.

Turning to the figures, FIG. 1 shows a schematic diagram of a system in accordance with one or more embodiments of the technology. As shown in FIG. 1, the system includes segment devices (e.g., segment device A (106), segment device N (108)), a master device (120), and an interconnect (118). The master device (120) may be connected via network (104) to client device (102) in accordance with one or more embodiments of the technology. Each of these components is described below.

In general, the various devices shown in FIG. 1 (e.g., segment device (e.g., segment device A (106), segment device N (108)), master device (120), client device (102)) and network (104) may each correspond to the computing device and network shown in FIGS. 5.1 and 5.2 and described below. The client device (102) includes functionality to send queries to the master device (120) via network (104). Multiple heterogeneous client devices may exist. In particular, although FIG. 1 shows a single client device, thousands or millions of client devices may be sending queries to the master device.

Continuing with FIG. 1, the segment device (e.g., segment device A (106), segment device N (108)) may correspond to a server that includes functionality to store a segment of data records (e.g., data records A (110), data records N (112)). In particular, a segment device includes hardware, such as a computing processor, persistent storage, and other hardware that manages a portion of a database. In one or more embodiments of the technology, a single table of the database may span multiple segment devices. For example, a portion of the data records (e.g., data records A (110), data records N (112)) may be stored on one segment device, while another portion is stored on a different segment device.

The segment devices may include a local database manager (e.g., local database manager A (114), local database manager N (116)). The local database manager (e.g., local database manager A (114), local database manager N (116)) is software, hardware, and/or firmware that executes or is otherwise located on the segment device. The local database manager includes functionality to process queries sent to the segment device. For example, the queries may be an insert query to insert one or more data records, a select query to obtain data from one or more data records, an update query to update data in one or more data records, and a delete query for deleting one or more data records. The local database manager includes functionality to process the received query locally and transmit a result to the master device (described below).

The local database manager may further include functionality to process a callback handler when an insert query, delete query, or update query is transmitted to the segment device. A callback handler is a set of software instructions that is transferred as an argument in a call to another program (e.g., local database manager). The callback handler, when executed, includes functionality to obtain data for a future object based on the execution of the query, and store the data in the future object. A future object is a software object that stores a result of an asynchronous computation.

Continuing with FIG. 1, the segment device (e.g., segment device A (106), segment device N (108)) is operatively connected via an interconnect (118) to a master device (120). The interconnect (118) is a collection of one or more devices, wires, backplane, and/or other hardware, software, and firmware that connects the segment devices with the master device. In other words, the interconnect includes functionality to transmit communications between the devices. For example, the interconnect may include the devices and wires of a mid-plane, backplane, local area network, or other connection infrastructure.

The master device (120) includes functionality to perform first stage processing of queries from client devices to the system and respond to client devices. Although FIG. 1 shows a single master device, multiple master devices may exist. The master device (120) includes a query execution engine (122), a metadata agent (124), and a metadata table (126). The query execution engine (122) is hardware, software, firmware, or any combination thereof that includes functionality to execute queries by sending queries to segment device, receive and aggregate results from the segment device, and respond to the client device (102). The query execution engine (122) may further include functionality to perform analytics on the database and generate reports based on the analytics.

In accordance with one or more embodiments of the technology, the metadata agent (124) includes functionality to intercept queries to the database. In particular, the metadata agent (124) is hardware, software, firmware, or any combination thereof that that includes functionality to interpret queries, identify the one or more segment devices having the data matching the queries, and transmit the query to the one or more segment devices. The metadata agent (124) further includes functionality to receive updates from the segment devices and update the metadata table (126).

In one or more embodiments of the technology, the metadata agent (124) is operatively connected to the metadata table (126). In other words, the metadata agent (124) is connected directly or indirectly, permanently or intermittently, to the metadata table (126). The metadata table (126) is a storage structure for storing metadata table records (200) for the data records (e.g., data records A (110), data records N (112)). In one or more embodiments of the technology, the metadata table (126), is an in memory metadata table. In such embodiments, the metadata table may be stored in and accessed from random access memory (RAM). In other words, the use of the term table refers to a logical relationship between components of the metadata table (126). In one or more embodiments of the technology, the metadata table (126) stores a metadata table record (not shown) for each data record on a segment device. In other words, each individual data record may have a corresponding distinct metadata table record in the metadata table in accordance with one or more embodiments of the technology. The metadata table record is shown and described in FIG. 2.

Figure 2:
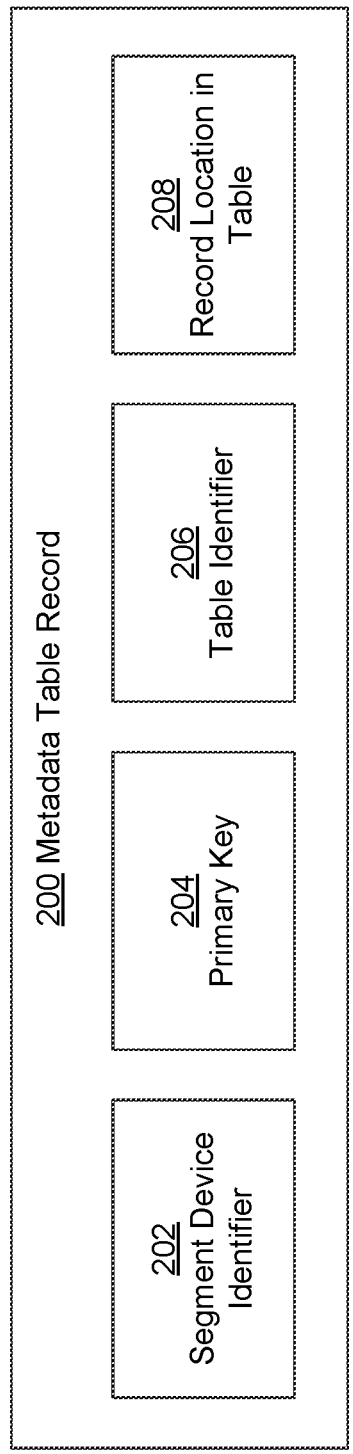

As shown in FIG. 2, the metadata table record (200) includes functionality to store a segment device identifier (202), a primary key (204), a table identifier (206), and a record location in the table (208) in accordance with one or more embodiments of the technology. The segment device identifier (202) is a unique identifier for the segment device storing the data record. In one or more embodiments of the technology, the segment device identifier is unique amongst the segment devices in the system. The segment device identifier may be a globally unique identifier. For example, the segment device identifier (202) may be an internet protocol address, a media access control address, or any other unique identifier.

The primary key (204) is the primary key of the data record in the table. The table identifier (206) is a unique identifier for the table storing the data record. In one or more embodiments of the technology, the table identifier is unique amongst the tables in the data base. In other embodiments, the table identifier is unique amongst the tables stored on the segment device. For example, the table identifier may be the table name. The record location in the table (208) is an address of the data record on the table. In some embodiments, the record location in the table (208) is excluded. In some embodiments, the primary key (204) is excluded. In other embodiments, both the record location and the primary key are included.

While FIGS. 1 and 2 show a configuration of components, other configurations may be used without departing from the scope of the technology. For example, various components may be combined to create a single component. As another example, the functionality performed by a single component may be performed by two or more components.

Figure 3:
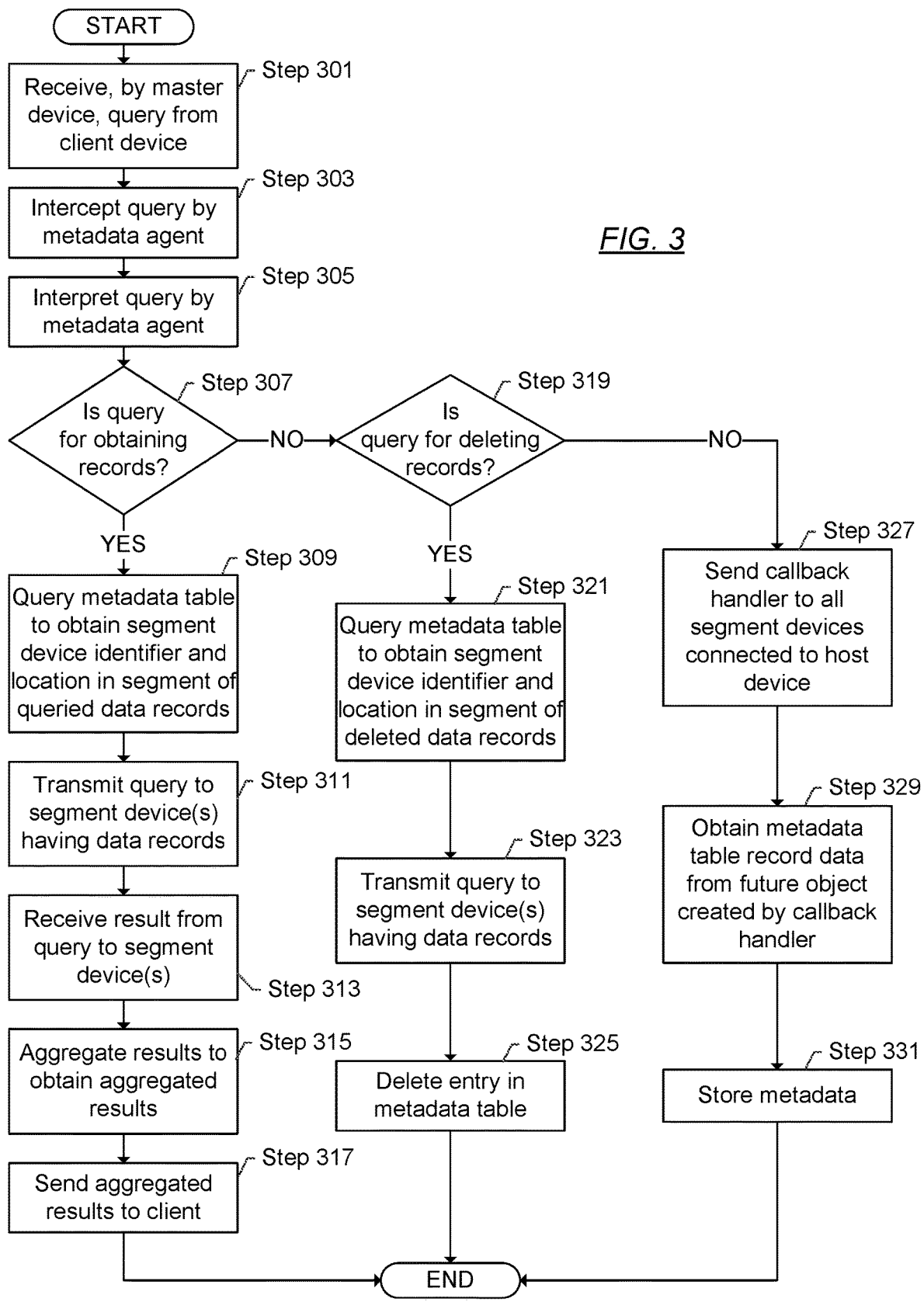
FIG. 3 shows a flowchart in accordance with one or more embodiments of the technology.

FIG. 3 shows a flowchart in accordance with one or more embodiments of the technology. While the various steps in this flowchart are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the technology. By way of an example, determination steps may not require a processor to process an instruction unless an interrupt is received to signify that condition exists in accordance with one or more embodiments of the technology. As another example, determination steps may be performed by performing a test, such as checking a data value to test whether the value is consistent with the tested condition in accordance with one or more embodiments of the technology.

In Step 301, a master device receives a query from a client device in accordance with one or more embodiments of the technology. In one or more embodiments of the technology, multiple client devices may send queries concurrently to the master device. The queries may be sent via a network or via another application on the master device. If sent via the Internet, the query may be processed through the various layers of the open systems interconnect (OSI) model. If sent via the same device, the query may be processed using inter-process communication described below.

In Step 303, the query is intercepted by the metadata agent in accordance with one or more embodiments of the technology. In other words, the query is received by the metadata agent. For example, the metadata agent may monitor the connection (e.g., socket) in which the query execution engine receives queries. By way of another example, queries may be transmitted to the metadata agent.

In Step 305, the query is interpreted by the metadata agent in accordance with one or more embodiments of the technology. Interpreting the query may include parsing the query into components. In one or more embodiments of the technology, when parsing the query, the type of query is identified. In other words, the operation requested in the query is determined. Further, interpreting the query includes identifying the data records requested by the query. The data records may be identified based on the primary key. In some embodiments, in addition to the primary key, indexes for the database are stored on the master device. In such embodiments, the indexes may be used for interpreting the query. Various query interpretation techniques may be used without departing from the scope of the technology. In particular, the operations in the query may be identified and performed using the indexes.

Where data is not in an index that is used to process the query, interpreting the query may include submitting requests to the segment devices to obtain intermediate results from the query. In such a scenario, when requests are sent to the segment devices, the segment devices having the matching data records are identified using the techniques described below. In other words, rather than sending a request for intermediate results to all segment devices, the request is only sent to the segment devices that may have data records having the intermediate results. The query may continue to be processed using the intermediate results.

In Step 307, a determination is made whether the query is for obtaining data records in accordance with one or more embodiments of the technology. In other words, a determination is made whether the query is a select query. If the query is a select query, the flow may proceed to Step 309.

In Step 309, the metadata table is queried to obtain segment device identifier and location in the segment of the queried data records in accordance with one or more embodiments of the technology. In other words, when interpreting the query, the primary key and table identifier of requested data records may be identified, such as directly from the query, from an index using data in a query, from intermediate results, or from another source. Metadata table records may be obtained using the identified primary key and table identifier. In other words, metadata table records that have the primary key(s) and table identifier are identified, and the corresponding segment devices and locations are obtained.

In Step 311, the query is sent to segment device(s) having the data records in accordance with one or more embodiments of the technology. In one or more embodiments of the technology, the query is transmitted via the interconnect. Various communication methods may be used to transmit the query to the segment devices. For example, the query may be sent using inter-processor communication described below.

In Step 313, results of the query are received from the segment device(s) in accordance with one or more embodiments of the technology. The results may be received in a same or similar manner to transmitting the query.

In Step 315, the results are aggregated in accordance with one or more embodiments of the technology. In other words, the results are grouped into a single response. For example, data records may be combined. The combined data records may be ordered, such as according to an attribute, the segment device identifier having the data record, or based on another feature.

In Step 317, the aggregated results are sent to the client device in accordance with one or more embodiments of the technology. Sending the aggregated results may be performed using a same or similar technique to receiving the results discussed above.

Returning to Step 307, if the query is not for obtaining a data record, the query may be for deleting data records. In Step 319, a determination is made whether the query is for deleting one or more data records. In other words, a determination is made whether the operation in the query is to delete one or more data records. If the determination is made to delete data records, the flow may proceed to Step 321.

In Step 321, the metadata table is queried to obtain the segment device identifier and the location of the segment of the deleted data records in accordance with one or more embodiments of the technology. Querying the metadata table may be performed using a same or similar technique discussed above with reference to Step 309. In Step 323, the query is transmitted to the segment device(s) having the data records in accordance with one or more embodiments of the technology. Transmitting the query may be performed using a same or similar technique discussed above with reference to Step 311. As a result of transmitting the query, any segment device that receives the query deletes each matching data record. Deleting the matching data records may be performed by marking the data records for deletion, marking the storage space storing the data records as available, overwriting the data records one or more times and marking the storage space as available, or performing other techniques.

In Step 325, the entries in the metadata table are deleted in accordance with one or more embodiments of the technology. In other words, for each matching data record that is deleted, the corresponding metadata table record is deleted as well. Deleting the record in the metadata table may be performed in a same or similar technique to deleting the data record on the segment device. Confirmation of the deletion may or may not be sent between two or more of the devices (e.g., segment device and master device, master device and client device).

Returning to Step 319, if the query is not for deleting data records, the query may be for inserting one or more data records in accordance with one or more embodiments of the technology. In such a scenario, a callback handler is sent to all segment devices with the data to be inserted in Step 327 in accordance with one or more embodiments of the technology. In other words, when the query is transmitted to the segment device, the callback handler is transmitted with the query with instructions for updating the metadata table. For example, the metadata agent in interpreting the query may inject into the insert query the callback handler. The metadata agent may then forward the revised query to the query execution engine, which sends the revised query to the segment devices. The segment devices that insert a data record into the database may execute the instructions in the callback handler to store metadata table record data in one or more future objects. The future object may or may not be transmitted immediately to the master device. For example, the future object may remain on the segment device until requested by the metadata agent. In other embodiments, the future object is returned as a result to the metadata agent.

In Step 329, metadata table record data is received from the future object in accordance with one or more embodiments of the technology. In other words, the metadata agent extracts the data from the future object. The metadata agent may asynchronously request the data from local storage on the segment device. By way of another example, the metadata agent may extract the data from a storage location on the master device. Regardless of how the metadata agent obtains the future object, the metadata agent extracts the data from the future object. In Step 331, the metadata is stored as a new metadata table record in the metadata table. In other words, the metadata table is updated to reflect the new data records stored in the metadata table.

Although FIG. 3 shows using a callback handler and a future object, other techniques for inserting one or more data records may be used without departing from the scope of the technology. For example, the local database manager may be pre-configured to send an update to the metadata table when a new data record is inserted into the database on the segment device.

FIG. 4.1 shows an example in accordance with one or more embodiments of the technology. The following example is for explanatory purposes only and not intended to limit the scope of the technology. In particular, FIG. 4.1 shows an example timing diagram for inserting a data record into the database. As shown in FIG. 4.1, the example system includes a query executer engine (402), a metadata agent (404), a metadata table (406), and four segment devices (e.g., segment 1 (408), segment 2 (410), segment 3 (412), and segment 4 (414)). In the example, consider the scenario in which the metadata agent (404) intercepts a request to insert one or more data records dr into the database. In such a scenario, after interpreting the request, the metadata agent (404) injects into the insert query a callback handler cbh on the data record dr (416). In other words, the metadata agent revises the insert query to include the callback handler cbh and forwards the revised query to the query execution engine (402). The query execution engine issues commands (e.g., 418, 420, 422, and 424) to insert the data record dr to each of the segment devices. The particular segment devices that receive the command with the query and insert the data record processes the instructions in the callback handler cbh. By processing the instructions, the segment device store the metadata for the inserted data record into a future object. The metadata includes the segment device identifier. In 426, the metadata agent stores metadata of the inserted data records dr into the metadata table using the callback handler cbh. In other words, the metadata agent accesses the future object for each of the inserted data records and extracts the metadata from the future object. The metadata agent may then store the metadata in the metadata table (406).

FIG. 4.2 shows an example timing diagram for processing a query to obtain data from one or more data records. The example system in FIG. 4.2 is the same as the example system in FIG. 4.1. Further, as described above, the example is for explanatory purposes only and not intended to limit the scope of the technology.

In 450, the metadata agent receives a query to perform a lookup having an index and a column value. The metadata agent (404) partitions the query and performs a first look-up (452) in the metadata table (406) to identify segment devices having the requested data. In response, the segment device 1 and segment device 3 are identified by the metadata table as having matching data records (454). Accordingly, the query execution engine sends an execution command (456, 458) to segment device 1 (408) and segment device 3 (412). Because the query is not sent to all segment devices, the other segment devices may continue processing other queries. Thus, one or more embodiments of the technology may increase throughput of the system. In 460 and 462, the query execution engine receives data records from segment device 1 (408) and segment device 3 (412). The query execution engine (402) aggregates the results (464) and transmits the aggregated results to the client device in accordance with one or more embodiments of the technology. Because the client device does not have to wait for irrelevant processing by unrelated segments, the client device may receive the results of the query faster in accordance with one or more embodiments of the technology.

Embodiments of the technology may be implemented on a computing system. Any combination of mobile, desktop, server, router, switch, embedded device, or other types of hardware may be used. For example, as shown in FIG. 5.1, the computing system (500) may include one or more computer processor(s) (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), and a communication interface (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores, or micro-cores of a processor. The computing system (500) may also include one or more input device(s) (510), such as a touchscreen, keyboard, mouse, microphone, touchpad, electronic pen, or any other type of input device.

The communication interface (512) may include an integrated circuit for connecting the computing system to a network (not shown) (e.g., a local area network (LAN), a wide area network (WAN) such as the Internet, mobile network, or any other type of network) and/or to another device, such as another computing device.

Further, the computing system (500) may include one or more output device(s) (508), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The input and output device(s) may be locally or remotely connected to the computer processor(s) (502), memory (504), and storage device(s) (506). Many different types of computing systems exist, and the aforementioned input and output device(s) may take other forms.

Software instructions in the form of computer readable program code to perform embodiments of the technology may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the technology.

The computing system (500) in FIG. 5.1 may be connected to, or a part of, a network. For example, as shown in FIG. 5.2, the network (520) may include multiple nodes (e.g., node X (522), node Y (524)). Each node may correspond to a computing system, such as the computing system shown in FIG. 5.1, or a group of nodes combined may correspond to the computing system shown in FIG. 5.1. By way of an example, embodiments of the technology may be implemented on a node of a distributed system that is connected to other nodes. By way of another example, embodiments of the technology may be implemented on a distributed computing system having multiple nodes, where each portion of the technology may be located on a different node within the distributed computing system. Further, one or more elements of the aforementioned computing system (500) may be located at a remote location and connected to the other elements over a network.

Although not shown in FIG. 5.2, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5.1. Further, the client device (526) may include and/or perform all or a portion of one or more embodiments of the technology.

The computing system or group of computing systems FIGS. 5.1 and 5.2 may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces, or communication channel endpoints, enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seeks data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment, by one process, may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the technology. The processes may be part of the same or different application, and may execute on the same or different computing system.

Rather than or in addition to sharing data between processes, the computing system performing one or more embodiments of the technology may include functionality to receive data from a user. For example, in one or more embodiments, a user may submit data via a graphical user interface on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from local memory by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system in performing one or more embodiments of the technology may extract one or more data items from the obtained data. For example, the extraction may be performed as follows by the computing system in FIG. 5.1. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail—such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string, or may be a query presented to a structured data repository (where the data repository may be organized according to a database schema or data format, such as XML).

The extracted data may be used for further processing by the computing system. For example, the computing system of FIG. 5.1 while performing one or more embodiments of the technology may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate if the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the technology, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 5.1 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from storage and perform computations to respond to the query. The DBMS may return the result(s) to the user, or software application.

The computing system of FIG. 5.1 may include functionality to present raw and/or processed data, such as results of comparisons and other processing. For example, presenting data may be accomplished through various presenting methods. Specifically, data may be presented through a user interface provided by a computing device. The user interface may include a graphical user interface (GUI) that displays information on a display device, such as a computer monitor or a touchscreen on a handheld computer device. The graphical user interface may include various graphical user interface widgets that organize what data is shown as well as how data is presented to a user. Furthermore, the graphical user interface may present data directly to the user, e.g., data presented as actual data values through text, or rendered by the computing device into a visual representation of the data, such as through visualizing a data model.

For example, a graphical user interface may first obtain a notification from a software application requesting that a particular data object be presented within the graphical user interface. Next, the graphical user interface may determine a data object type associated with the particular data object, e.g., by obtaining data from a data attribute within the data object that identifies the data object type. Then, the graphical user interface may determine any rules designated for displaying that data object type, e.g., rules specified by a software framework for a data object class or according to any local parameters defined by the graphical user interface for presenting that data object type. Finally, the graphical user interface may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions present only a few examples of functions performed by the computing system of FIG. 5.1 and the nodes and/or client device in FIG. 5.2. Other functions may be performed using one or more embodiments of the technology.

While the technology has been described with respect to a limited number of embodiments, those skilled in the art, having benefit of this disclosure, will appreciate that other embodiments can be devised which do not depart from the scope of the technology as disclosed herein. Accordingly, the scope of the technology should be limited only by the attached claims.

What is claimed is:

1. A method for processing queries comprising:
receiving, by a master device, a first query from a client device;
interpreting, by the master device, the first query to identify a first data record identifier matching the first query;

obtaining, using a metadata table on the master device, a first segment device identifier storing a first data record identified by the first data record identifier for the first query;

sending the first query to a first segment device of a plurality of segment devices, the first segment device being identified by the first segment device identifier;

receiving a first result of the first query from the first segment device; and transmitting the first result to the client device.

2. The method of claim 1, wherein interpreting the first query comprises identifying the first query as a select query, and executing the select query.

3. The method of claim 1, further comprising:
receiving, by the master device, a second query from the client device;
interpreting, by the master device, the second query to determine that the second query is an insert query;
sending the second query to each of the plurality of segment devices based on the second query being an insert query;
receiving a location identifier and a second data record identifier of a second data record inserted by the second query; and
storing the location identifier and the second data record identifier in the metadata table.

4. The method of claim 3, wherein the second query is sent to each of the plurality of segment devices with a callback handler.

5. The method of claim 4, wherein receiving the location identifier and the second data record identifier comprises querying a future object populated by the callback handler.

6. The method of claim 1, wherein interpreting the first query identifies a second data record identifier matching the first query, and wherein the method further comprises:
obtaining, using the metadata table on the master device, a second segment device identifier storing a second data record identified by the second data record identifier for the first query;
sending the first query to a second segment device of the plurality of segment devices, the second segment device being identified by the second segment device identifier;
receiving a second result of the first query from the second segment device; and
aggregating the second result with the first result to obtain an aggregated result, wherein transmitting the first result to the client device comprises transmitting the aggregated result.

7. The method of claim 1, further comprising:
receiving, by the master device, a second query from the client device;
interpreting, by the master device, the second query to determine that the second query is a delete query;
obtaining, using the metadata table on the master device, a plurality of segment device identifiers for a subset of the plurality of segment devices storing a data record satisfying the second query;
sending the second query to each segment device in the subset based on the plurality of segment device identifiers; and
updating the metadata table to remove data records matching the second query.

8. The method of claim 1, wherein the first query is sent only to a subset of the plurality of segment devices, wherein each segment device in the subset has at least one data record satisfying the first query.

9. A system for processing queries, the system comprising:
a computer processor;
a storage storing:
instructions for a metadata agent, that, when executed on the computer processor:
intercept a first query from a client device,
interpret the first query to identify a first data record identifier matching the first query,
obtain, using a metadata table on a master device, a first segment device identifier storing a first data record identified by the first data record identifier for the first query, and
send the first query to a first segment device of a plurality of segment devices, the first segment device being identified by the first segment device identifier; and
instructions for a query execution engine that, when executed on the computer processor:
receive a first result of the first query from the first segment device, and
transmit the first result to the client device.

10. The system of claim 9, wherein the storage further stores instructions for a callback handler, wherein the callback handler, when executed, transmits an update to the metadata table.

11. The system of claim 10, wherein the storage further stores for a future object, wherein the future object stores the update to the metadata table.

12. The system of claim 9, wherein the storage further stores the metadata table, wherein the metadata table stores for each of a plurality of data records:
a primary key, a segment device identifier, a table name of a table having the data record, and a record location on the table.

13. A non-transitory computer readable medium comprising computer readable program code for processing queries, the computer readable program code for:
receiving, by a master device, a first query from a client device;
interpreting, by the master device, the first query to identify a first data record identifier matching the first query;
obtaining, using a metadata table on the master device, a first segment device identifier storing a first data record identified by the first data record identifier for the first query;
sending the first query to a first segment device of a plurality of segment devices, the first segment device being identified by the first segment device identifier;
receiving a first result of the first query from the first segment device; and
transmitting the first result to the client device.

14. The non-transitory computer readable medium of claim 13, wherein interpreting the first query comprises identifying the first query as a select query, and executing the select query.

15. The non-transitory computer readable medium of claim 13, further comprising computer readable program code for:
receiving, by the master device, a second query from the client device;
interpreting, by the master device, the second query to determine that the second query is an insert query;
sending the second query to each of the plurality of segment devices based on the second query being an insert query;

receiving a location identifier and a second data record identifier of a second data record inserted by the second query; and storing the location identifier and the second data record identifier in the metadata table.

16. The non-transitory computer readable medium of claim 15, wherein the second query is sent to each of the plurality of segment devices with a callback handler.

17. The non-transitory computer readable medium of claim 16, wherein receiving the location identifier and the second data record identifier comprises querying a future object populated by the callback handler.

18. The non-transitory computer readable medium of claim 13, wherein interpreting the first query identifies a second data record identifier matching the first query, and wherein the non-transitory computer readable medium further comprises computer readable program code for:

obtaining, using the metadata table on the master device, a second segment device identifier storing a second data record identified by the second data record identifier for the first query;

sending the first query to a second segment device of the plurality of segment devices, the second segment device being identified by the second segment device identifier;

receiving a second result of the first query from the second segment device; and aggregating the second result with the first result to obtain an aggregated result, wherein transmitting the first result to the client device comprises transmitting the aggregated result.

19. The non-transitory computer readable medium of claim 13, further comprising computer readable program code for:

receiving, by the master device, a second query from the client device;

interpreting, by the master device, the second query to determine that the second query is a delete query;

obtaining, using the metadata table on the master device, a plurality of segment device identifiers for a subset of the plurality of segment devices storing a data record satisfying the second query;

sending the second query to each segment device in the subset based on the plurality of segment device identifiers; and updating the metadata table to remove data records matching the second query.

20. The non-transitory computer readable medium of claim 13, wherein the first query is sent only to a subset of the plurality of segment devices, wherein each segment device in the subset has at least one data record satisfying the first query.

* * * * *